(12) United States Patent
DeMent

(10) Patent No.: US 8,403,165 B2
(45) Date of Patent: Mar. 26, 2013

(54) SECURITY CLOSURE FOR CAM AND GROOVE HOSE COUPLING

(75) Inventor: R. Bruce DeMent, Palos Heights, IL (US)

(73) Assignee: Kastalon, Inc., Alsip, IL (US)

( * ) Notice: Subject to any disclaimer, the term of this patent is extended or adjusted under 35 U.S.C. 154(b) by 126 days.

(21) Appl. No.: 13/045,237

(22) Filed: Mar. 10, 2011

(65) Prior Publication Data
US 2011/0155735 A1 Jun. 30, 2011

Related U.S. Application Data

(63) Continuation-in-part of application No. 12/545,988, filed on Aug. 24, 2009, now Pat. No. 8,286,829.

(51) Int. Cl.
*B65D 55/14* (2006.01)
*B65D 45/20* (2006.01)

(52) U.S. Cl. ............... 220/210; 220/833; 220/323

(58) Field of Classification Search ............ 220/833, 220/210, 315; 285/323, 388, 81, 312, 84
See application file for complete search history.

(56) References Cited

U.S. PATENT DOCUMENTS

| | | | |
|---|---|---|---|
| 1,646,873 A | 10/1927 | Richards | |
| 2,033,142 A | 3/1936 | Lewis | |
| 2,187,119 A | 1/1940 | Fish | |
| 2,478,586 A | 8/1949 | Krapp | |
| 3,124,374 A | 3/1964 | Krapp | |
| 3,379,460 A | 4/1968 | Allyn | |
| 3,633,948 A | 1/1972 | Dickey | |
| 3,750,434 A | 8/1973 | Gerdes | |
| 3,860,274 A | 1/1975 | Ledstrom et al. | |
| 3,976,313 A | 8/1976 | Laufenburger et al. | |
| 4,064,717 A | 12/1977 | Neiman | |
| 4,222,593 A | 9/1980 | Laufenburger et al. | |
| 4,245,751 A | 1/1981 | Neiman | |
| 4,254,888 A * | 3/1981 | Chandler | 220/694 |
| 4,300,373 A * | 11/1981 | Camos et al. | 70/232 |
| 4,392,513 A | 7/1983 | Parrish | |
| 4,613,055 A * | 9/1986 | Connors | 220/210 |
| 4,969,923 A | 11/1990 | Reeder et al. | |
| 5,238,141 A * | 8/1993 | Callegari et al. | 220/725 |
| 5,295,717 A | 3/1994 | Chen | |
| 5,368,343 A * | 11/1994 | Allen | 285/312 |

(Continued)

*Primary Examiner* — Mickey Yu
*Assistant Examiner* — Niki Eloshway
(74) *Attorney, Agent, or Firm* — Milton Gerstein; Much Shelist

(57) ABSTRACT

A security closure system for terminating the hose-connector connected to the outlet of a storage tank whose contents are to be periodically pumped out. A first male-outlet component is provided with an outer, circumferential annual groove for reception therein of camming elements of camming arms, and has a terminal projecting tongue provided with an opening or hole for receiving a locking device, such as a padlock. The male-component is further provided with an enlarged mounting flange for mounting the male-component to a wall of the storage tank or to a bulkhead adjacent the storage tank. The security closure system also comprises a second female part, which is a female closure cap that matingly receives therein the first male-component. The closure cap has a slot for passing therethrough the tongue of the first male-component, whereby a padlock or other lock may be used for locking the cap in place over the first male-component. The closure cap is also provided with a pair of parallel, upstanding partitions or walls sandwiching therebetween the projecting tongue of the first male-component protruding through the slot of the closure cap. These partitions project a sufficient height above, and extend a sufficient length along, the protruding tongue so as to prevent access thereto and to the locking device inserted through the opening of the tongue, whereby access thereto is denied and the tampering thereof via saws, and the like, is prevented. Additional pins or rods are provided for additional tamper-proof resistance to cutting.

19 Claims, 16 Drawing Sheets

U.S. PATENT DOCUMENTS

| | | |
|---|---|---|
| 5,435,604 A | 7/1995 | Chen |
| 5,462,313 A | 10/1995 | Rea et al. |
| 5,462,316 A * | 10/1995 | Street et al. .................... 285/81 |
| 5,509,702 A | 4/1996 | Warehime et al. |
| 5,513,555 A | 5/1996 | Plank et al. |
| 5,568,946 A | 10/1996 | Jackowski |
| 5,586,367 A | 12/1996 | Benoit |
| 5,692,544 A | 12/1997 | Friedrich et al. |
| 5,704,655 A | 1/1998 | Lemburg |
| 5,816,623 A * | 10/1998 | Chang .............................. 285/88 |
| 6,015,168 A | 1/2000 | Fahl |
| 6,164,708 A | 12/2000 | Lin |
| 6,206,431 B1 * | 3/2001 | Street .............................. 285/80 |
| 6,290,267 B1 | 9/2001 | Swingley |
| 6,694,783 B2 | 2/2004 | Trempala |
| 6,834,888 B2 | 12/2004 | Campau |
| 2003/0106896 A1 * | 6/2003 | West et al. ..................... 220/210 |
| 2011/0155735 A1 * | 6/2011 | DeMent ........................ 220/315 |

\* cited by examiner

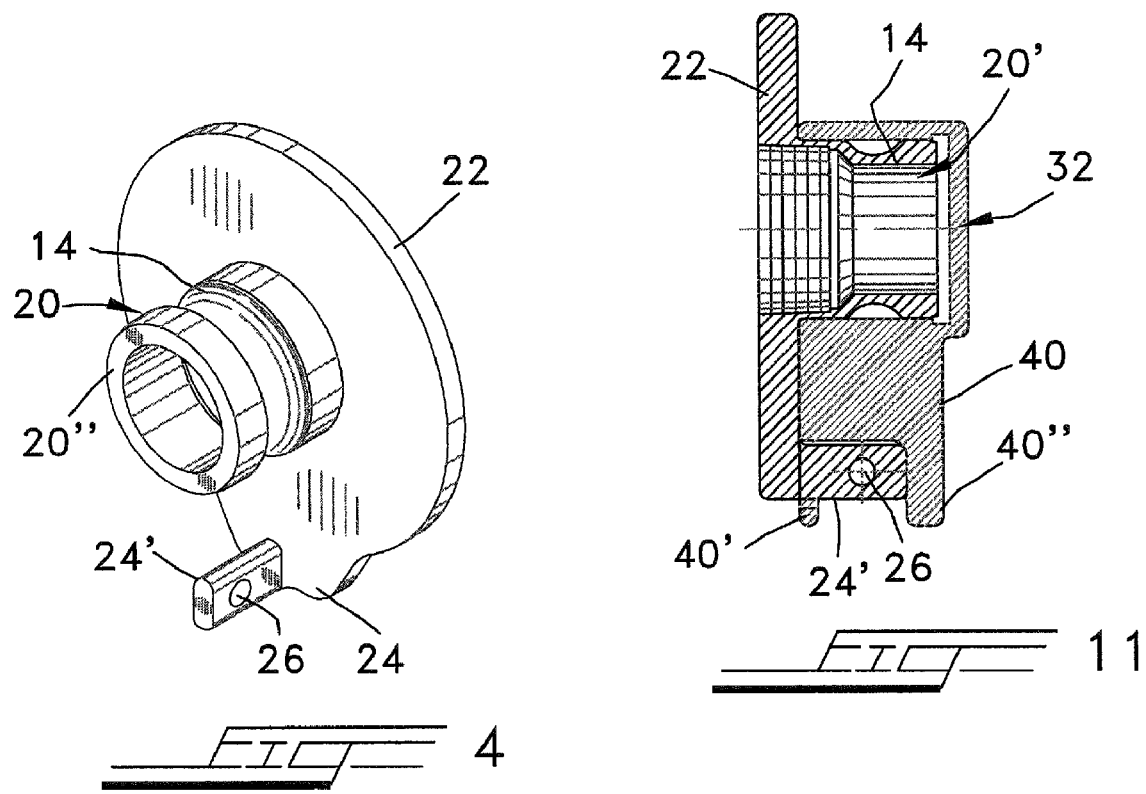
FIG. 4
FIG. 11
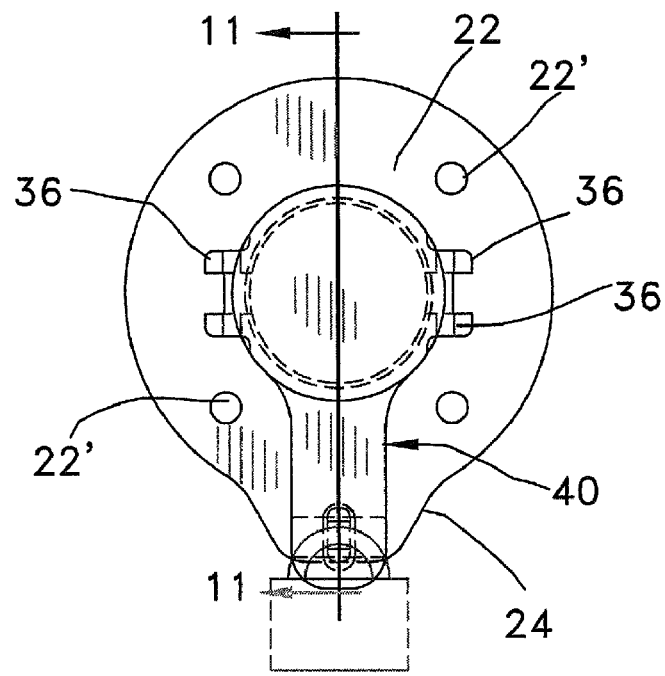
FIG. 10

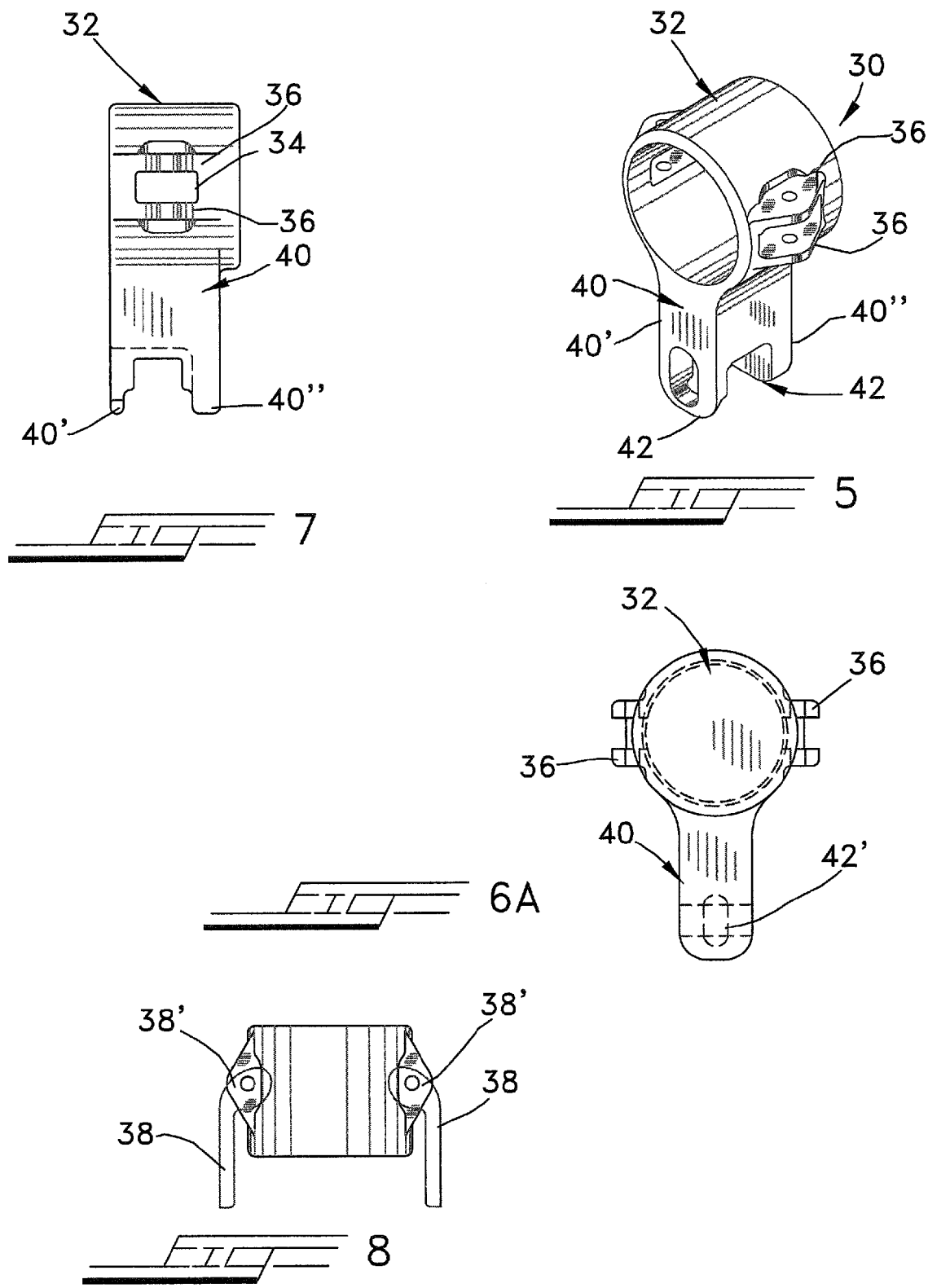

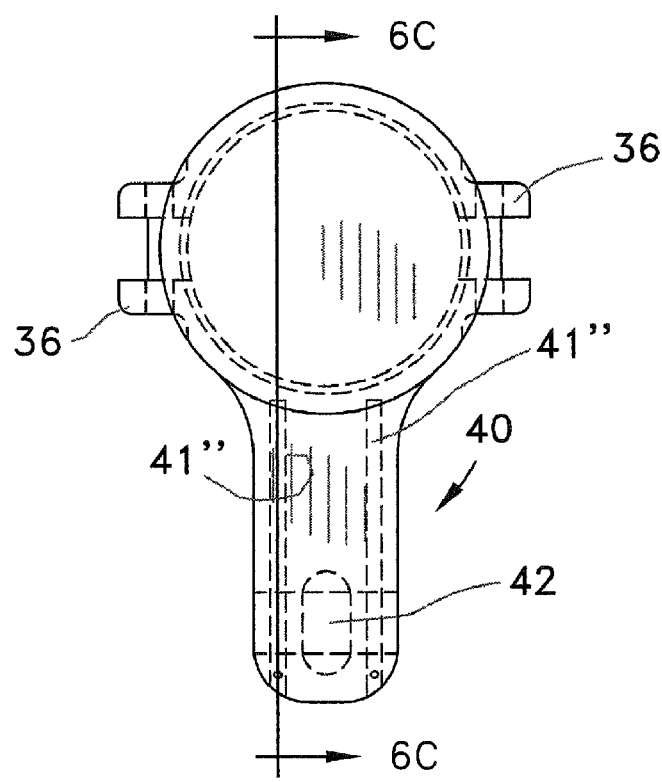
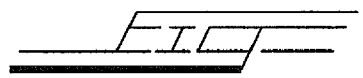
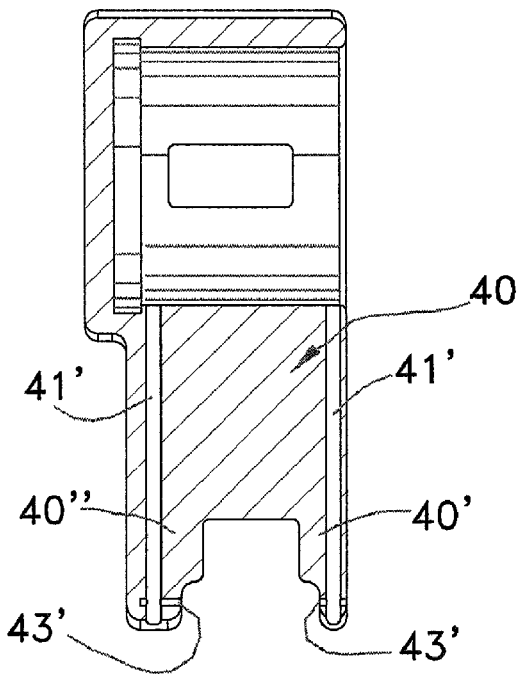

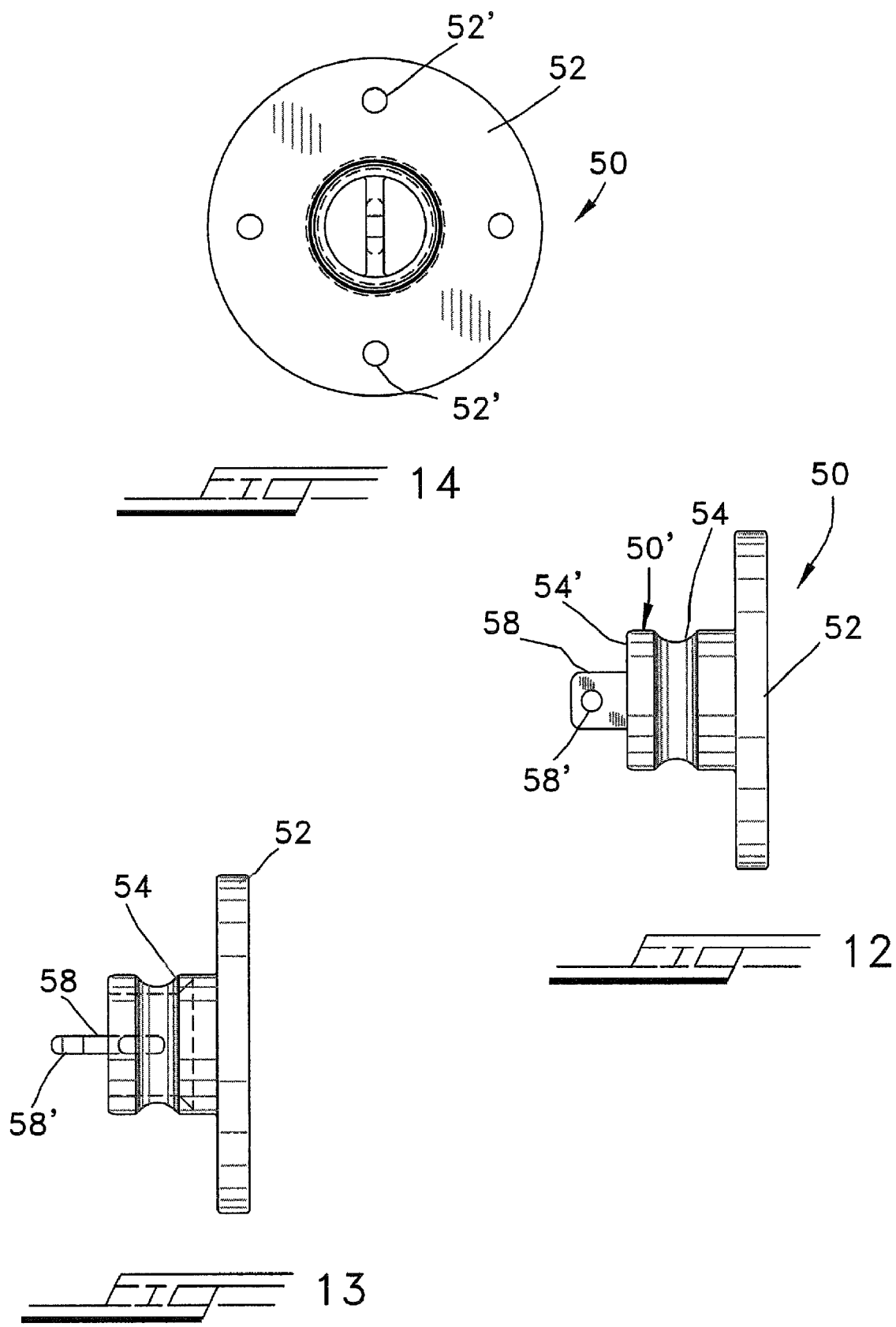

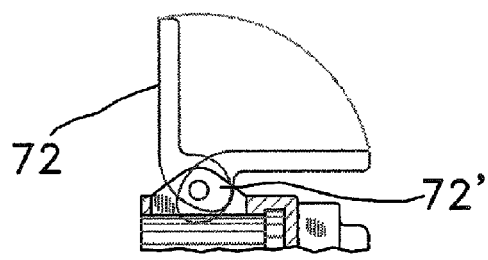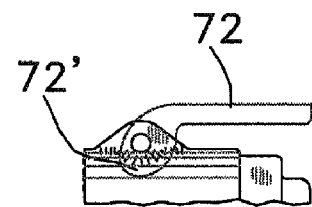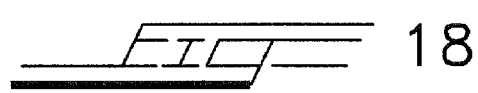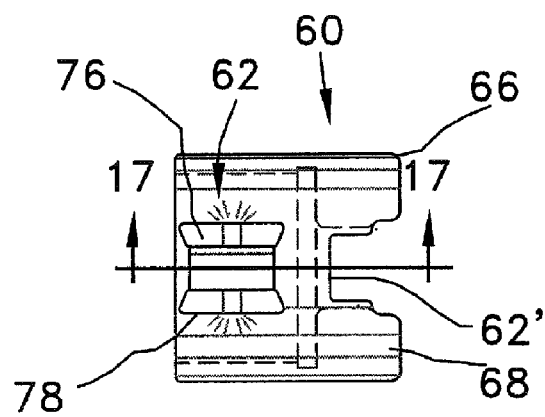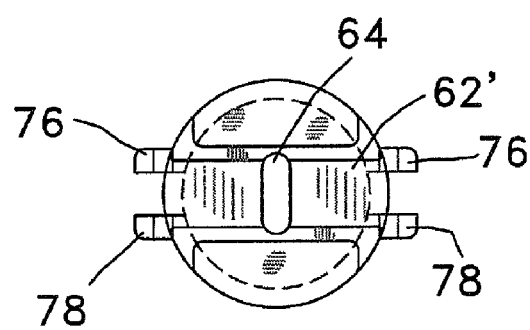

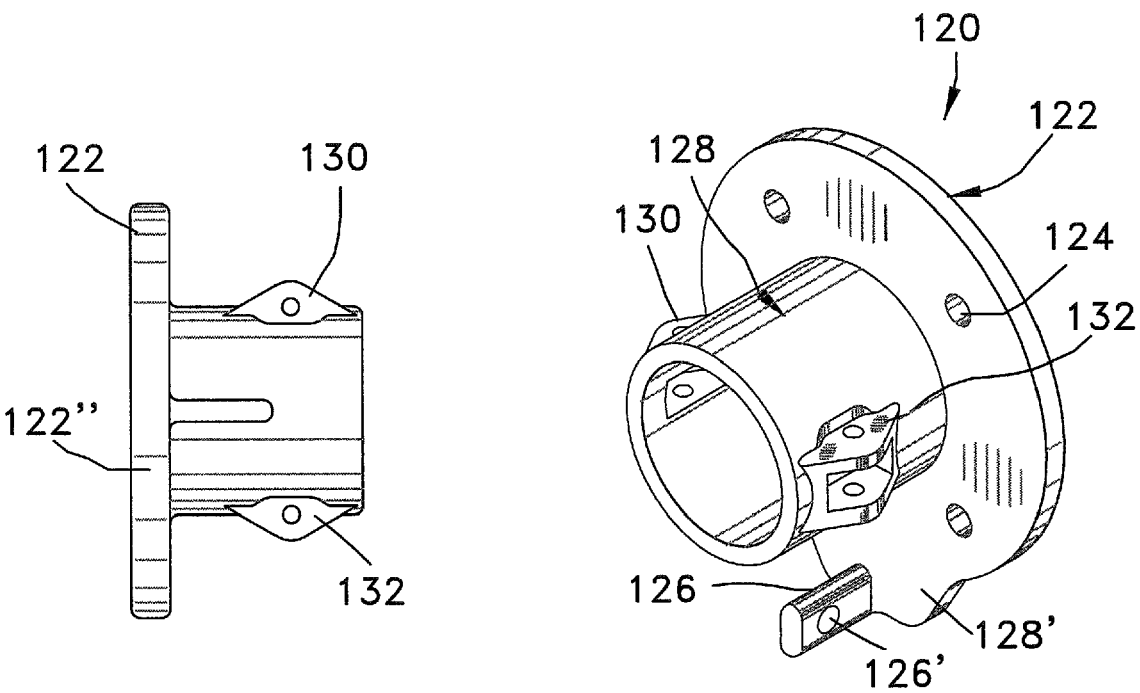
FIG. 32
FIG. 31
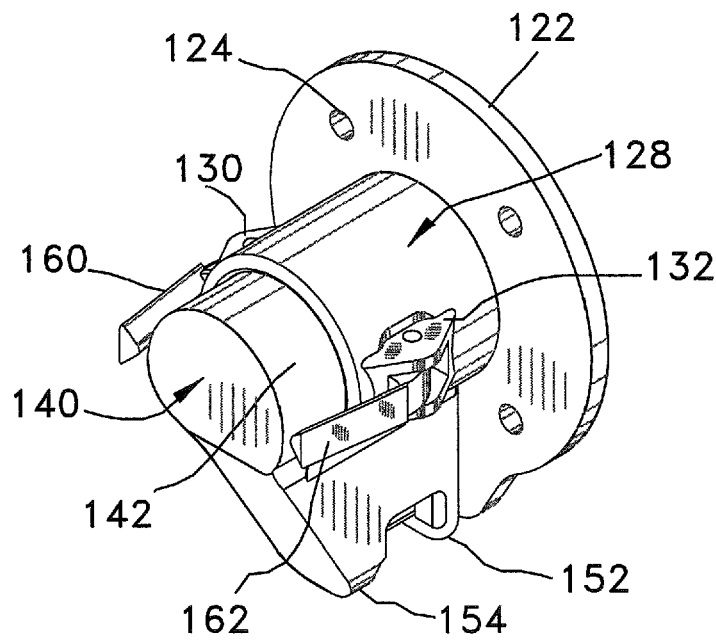
FIG. 33

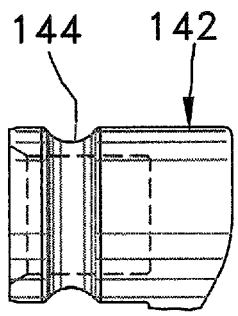
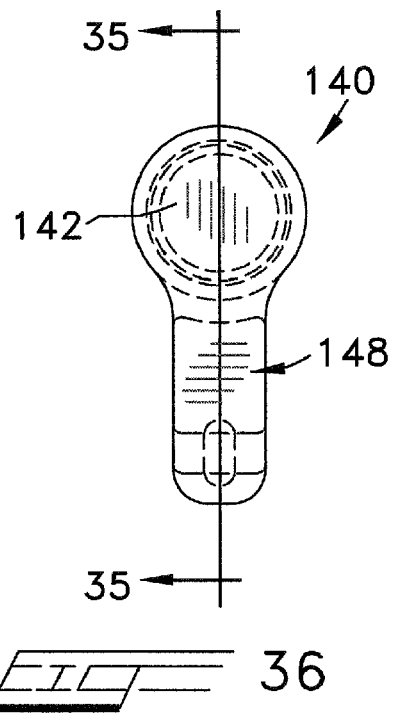
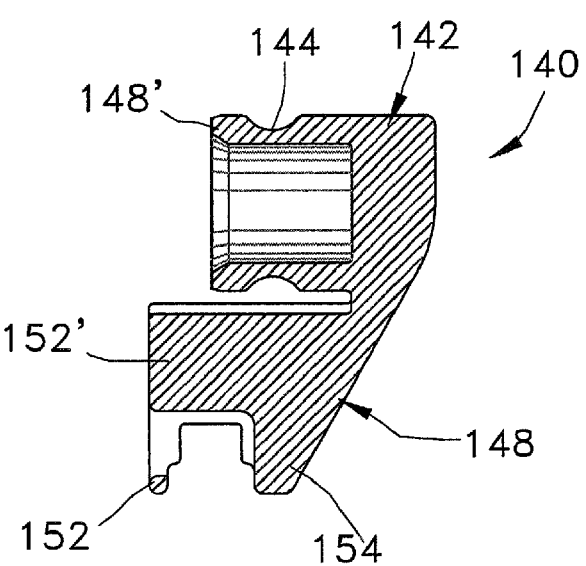

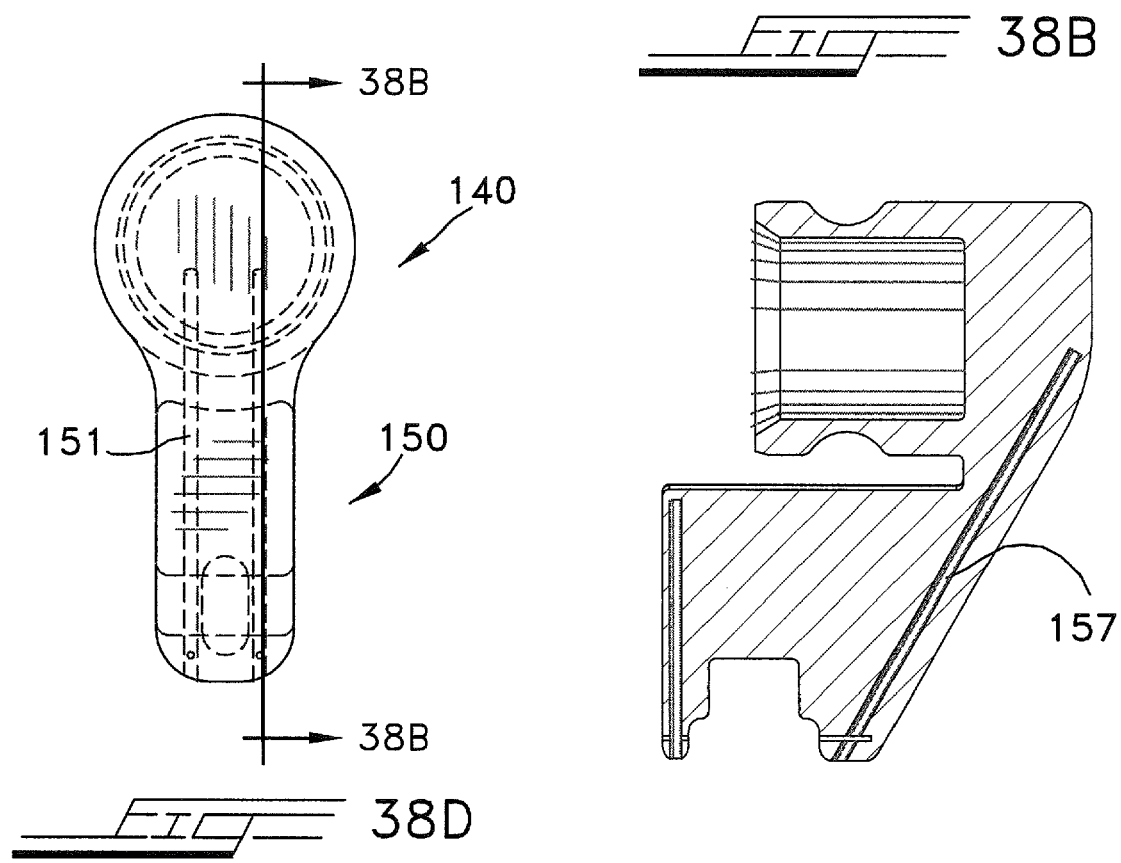
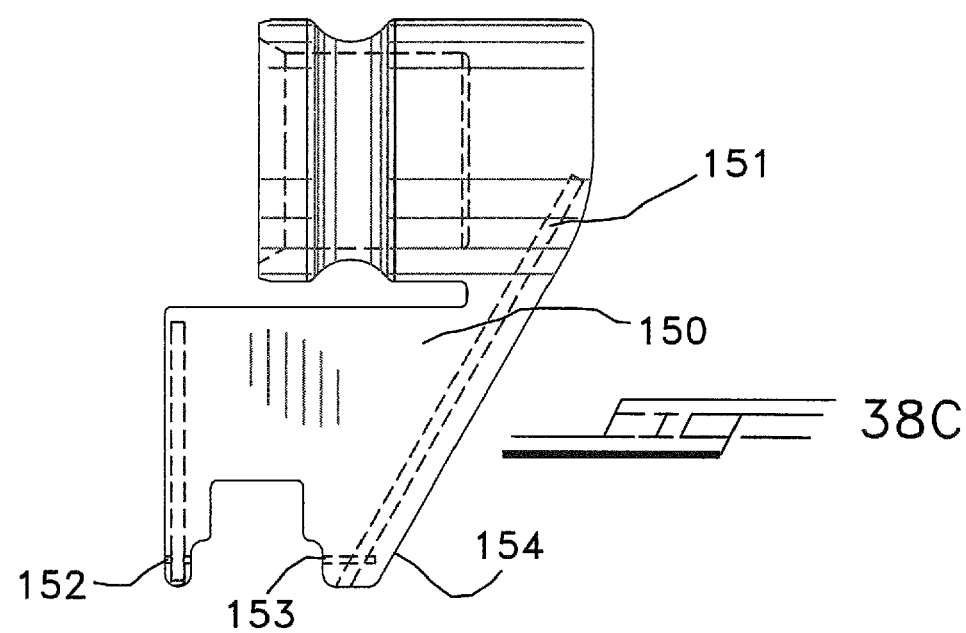

SECURITY CLOSURE FOR CAM AND GROOVE HOSE COUPLING

CROSS REFERENCE TO RELATED APPLICATION

This is a continuation-in-part of application Ser. No. 12/545,988, filed on Aug. 24, 2009, now U.S. Pat. No. 8,286,829.

BACKGROUND OF THE INVENTION

The present invention is directed to a secure-closure cap for a cam-and-groove hose coupling. Cam-and-groove hose couplings are used ubiquitously in many environments and areas for safely coupling together the ends of hoses and other connectors. A typical cam-and-groove coupling consists of an outer annular groove in the outer circumference of a male end of a first hose-connector, and a pair of diametrically-opposed, pivotal camming arms mounted by a female end of a second hose-connector. Each camming arm has a cam-element at a free, cantilevered end thereof which cooperates and extends into the interior of the female end of the second hose-connector. The cam-elements are receivable in the outer circumferential annular groove of the male end of the first hose connector when the male end is inserted into the female end when the two ends are coupled together. By rotating the camming arms in a first direction, the cam-elements are inserted in the annular groove of the inserted male end to couple the male and female ends together. By rotating the camming arms in the opposite direction, the cam-elements are removed from the annular groove to thus release the coupling. The female end is usually provided with a securing mechanism for ensuring the camming arms do not accidentally rotate and remove the cam-elements from engagement in the annular groove of the inserted male end. Examples of such conventional cam-and-groove hose couplers are shown in U.S. Pat. Nos. 7,523,963; 6,447,016; 6,164,708; 5,988,693; and 5,462,316.

A cam-and-groove coupling is, also, commonly used to connect an outlet component of a storage tank to a connector of a tank of a transport truck for the periodic pumping of the contents of the storage tank to the tank of the truck. The storage tanks typically may store any liquid, such as gasoline, alcohol, used liquefied fats and deep-fryer oil, such as those found in storage tanks at restaurants, and the like. In order to pump contents from the storage tank to the truck-tank, a hose-connector extends from the outlet of the storage tank and is terminated with a male end having an outer circumferential annular groove. This male end is receivable in a female end of a hose connector associated with a transport truck's tank, when contents of the storage tank are to be pumped to the tank of the transport truck. This female end is provided with the above-described, rotating camming arms having distal cam-elements for reception in the annular groove of the male end in order to securely connect the male and female ends together during the pumping process, to ensure that they do not become disconnected. After the pumping of contents has been completed, the two ends are released, leaving the male end of the hose connector associated with the storage tank exposed. It is conventional practice to close off the male end of the hose connector associated with the storage tank via a metal or plastic closure cap. Such closure caps typically resemble the female end of the hose connector of the transport truck's tank in that it has a female component that receives the male end of the hose connector associated with the storage tank, and is similarly provided with camming arms with distal camming elements for reception in the annular groove of the male end of the hose connector associated with the storage tank. The male end has a closed end forming a closure cap, or dust cap, so that foreign matter is prevented from entering into the storage tank.

A problem exists with these prior-art closure caps in that they are not tamper-proof. It is a considerable problem in all industries that use storage tanks for storing fluid contents that are periodically pumped out to a transport tank, train car, or the like, that these camming arms, no matter how well protected from being accessed, are prone to attack by the use of bolt cutters, saws and other such devices, thus allowing ready access to and theft of the contents of the storage tank. Examples of closure caps for closing off the male end of the hose connector associated with the storage tank are disclosed in U.S. Pat. Nos. 5,462,316; 4,295,670, and 4,245,751.

FIG. 1 shows a conventional, prior-art closure cap device for a male-component outlet coupler 10 of a storage tank. The male coupler 10 consists of a male coupler proper 12 having an outer, annular groove 12', and an enlarged mounting flange 14 integrally connected to one end of the male coupler 12. The mounting flange 14 is affixed to a wall of a storage tank whose fluid contents are to be pumped out, or to a bulkhead associated with the storage tank, thus providing an outlet by means of which the fluid my be dispensed to a tanker truck, or the like. The male coupler is closed off, when not in use, by a female closure cap device 16 consisting of a female main housing or receptacle portion 16' which telescopingly receives therein the male component or coupler proper 12 for closing of the male coupler during nonuse. To ensure the male and female components do not accidentally come apart, a pair of diametrically-opposed camming arms 18 is provided, each having a distal camming member 18' receivable in locking engagement within the annular groove 12' of the male coupler 12. Rotation of the arms 18 in a first direction locks the camming members 18' in the annular groove 12', while rotation of the camming arms in the opposite direction releases the engagement therebetween. Suitable locking mechanisms may be employed to ensure that the camming arms 18 do not accidentally rotate and disengage the camming members 18' from engagement within the annular groove 12'.

Prior-art devices currently available provide some security by using the above-described locking cam-lever arms, thus indirectly providing security between the coupling and its cover or dust cap. Both the exposed lock and the cam lever arms, however, are prone to being cut by the use of bolt cutters, saws and other such devices.

SUMMARY OF THE INVENTION

In the primary objective of the present invention to provide a security closure system for a hose connector associated with a storage tank that is tamper and theft proof.

Toward these and other ends, the security closure system of the invention comprises a first part that is a terminal male-component that terminates the hose connector connected to the outlet of a storage tank whose contents are to be periodically pumped out. The male-component is provided with an outer, circumferential annual groove for reception therein of camming elements of camming arms, and with a terminal projecting tongue provided with an opening or hole for receiving a locking device, such as a padlock. The male-component is further provided with an enlarged mounting flange for mounting the male-component to a wall of the storage tank or to a bulkhead adjacent the storage tank. The security closure system also comprises a second part, which is a female closure cap that matingly receives therein the first male-component. The closure cap has a slot for passing therethrough the tongue of the first male-component, whereby a padlock or other lock may be used for locking the cap in place over the first male-component. The closure cap is also provided with a pair of parallel, upstanding partitions or walls sandwiching therebetween the projecting tongue of the first male-component protruding through the slot of the closure cap. These partitions project a sufficient height above, and extend a sufficient length along, the protruding tongue so as to prevent access thereto and to the locking device inserted through the opening of the tongue, whereby access thereto is denied and the tampering thereof via saws, and the like, is prevented. The closure cap is also, preferably, provided with camming arms with distal camming elements for reception in the annular groove of the first male-component, in the conventional manner, as described hereinabove. In order to further ensure a tamper-proof security cap, a loosely-mounted shaft or dowel pin is provided that may be also be freely rotatable in a hole or opening of the cap, whereby if a saw or cutting tool were to try to cut open the cap, it would engage this freely rotatable bolt or shaft, which would render any cutting by the saw useless.

BRIEF DESCRIPTION OF THE DRAWING

Reference is had to the accompanying drawings, wherein:

FIG. 4 is an isometric view of the male closure cap of the FIG. 2;

FIG. 5 is an isometric view of the second part of the invention showing the female outlet-hose coupler of the invention for mounting the first male part of FIG. 2;

FIG. 6A is a side elevational view thereof;

FIGS. 6B and 6C are modification of the coupler of FIG. 5 showing rotatable rods or pins inserted therein for additional prevention against tampering with a rotary saw or abrasive cutter.

FIG. 7 is a front view thereof;

FIG. 8 is a plan view of the camming arms associated with the second female part of FIG. 5 for engaging with the annular groove formed in the outer circumference of the first male part of FIG. 2;

FIG. 10 is a front view thereof showing a padlock used for locking the parts together;

FIG. 11 is an elevational cross-sectional view thereof;

FIG. 12 is a side elevational view showing the first male closure part of the invention according to a second of the invention;

FIG. 13 is a top view thereof;

FIG. 14 is a rear view thereof;

FIG. 15A is a side view of the second female outlet-hose coupler part according to the second embodiment for mounting the first male part of FIG. 12;

FIG. 16 is a bottom view thereof;

FIG. 17 is a partial plan view showing one of the camming arms associated with the second female outlet-hose coupler part;

FIG. 18 a partial plan view showing the camming arm of FIG. 17 in its closed, locking position in an annular groove of the first male part of FIG. 12;

FIG. 31 is an isometric view thereof;

FIG. 32 is a side view thereof;

FIG. 33 is an isometric view showing the coupling of the female and male parts of the fourth embodiment;

FIG. 34 is a partial view of the male closure cap component according to the fourth embodiment of the invention;

FIG. 35 is a partial cross-sectional side elevational view thereof;

FIG. 36 is an end view thereof; and

FIGS. 38B-38D show a modification of the coupler of FIG. 34 showing reinforcing rods or pins inserted therein for additional prevention against tampering by a rotary saw or abrasive cutter.

DETAILED DESCRIPTION OF THE INVENTION

Figure 1:
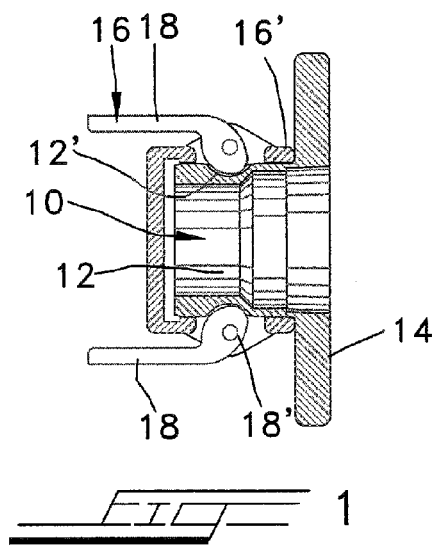
FIG. 1 is a cross-sectional side view of a prior-art closure cap for closing off an outlet of a storage tank shown connected to a storage-tank outlet-coupler.
Figure 2:
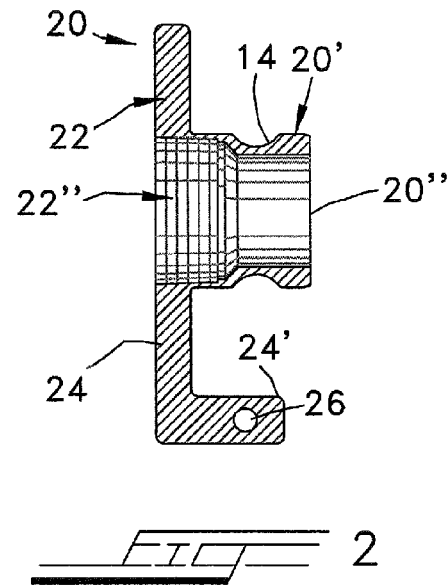
FIG. 2 is a cross-sectional side view showing the first male closure part of the invention according to a first embodiment of the invention.
Figure 3:
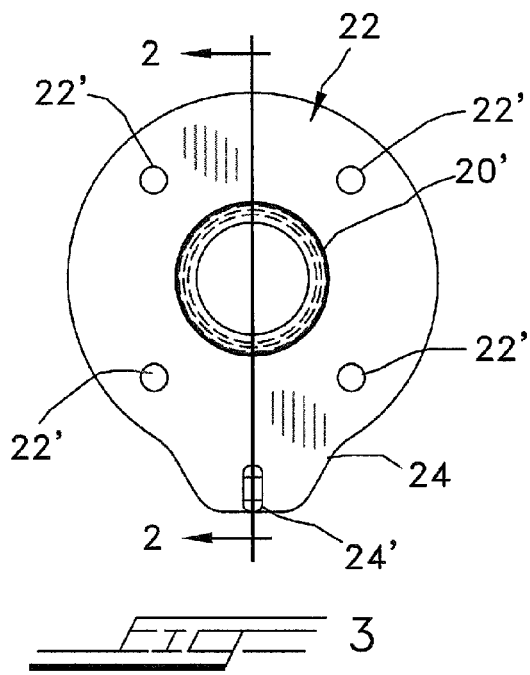
FIG. 3 a front view thereof.

Referring now to the drawings in greater detail, there is shown in FIGS. 2-11, there is shown a first embodiment of the security closure cap device of the invention. In the first embodiment, the outlet coupler 20 extending from the storage tank (not shown) is a male component as shown in FIGS. 2-4, and is made up of a main male component proper 20' with an outer circumferential, annular groove 14 for receiving camming members of camming arms of the mating female closure cap discussed hereinbelow. The male outlet coupler 20 also has an enlarged mounting flange element 22 integrally connected at one end of the male coupler proper 20' closest to the storage tank when mounted for use with a storage tank, which male coupler proper also has an internal-thread section 22", either of flange or pipe male or female threads, at its end adjacent the flange for receiving a hose connection associated with the storage tank. The mounting flange-element 22 is affixed to a wall of the storage tank or to a bulkhead associated with the storage tank for protecting it, by tamper-proof fasteners passing through an array of through-holes 22'. The flange-element 22 is generally circular in cross section except for an eccentric or lobe portion 24 from which outwardly projects a tongue or locking element 24'. The tongue 24' projects in a direction away from the mounting flange element 22 and towards the outward end 20'' of the male coupler 20'. This locking tongue 24' has a through-hole 26 through which may pass the shaft of a padlock or other similar locking device, for locking together the male and female components of the security closure cap device of the invention, as described in detail hereinbelow.

Figure 9:
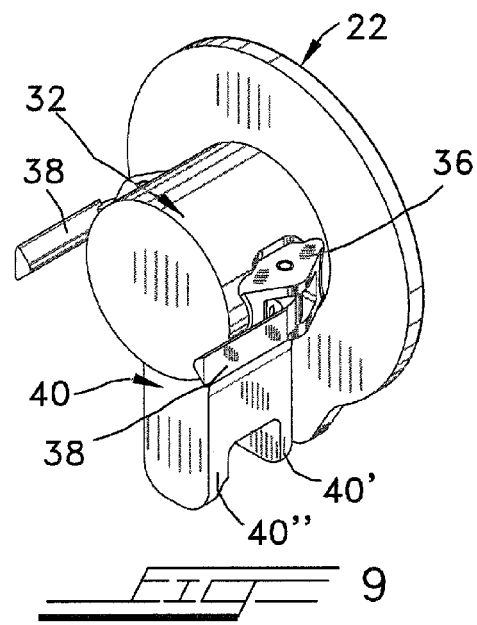
FIG. 9 is an isometric view showing the first male part and second female part with camming arms assembled together for providing a tamper-proof, locking cover for an outlet of a storage tank.

Referring now to FIGS. 5-8, there is shown the second or female part of the security closure cap device of the invention for closing off the male coupler proper 20' of the first outlet component 20. The female part is made up of a closure cap element 30 having a main, female receptacle portion 32 which telescopingly receives therein the male coupler proper 20'. The receptacle portion 32 is provided with a pair of diametrically-opposed slots or openings 34 defined between mounting ears or brackets 36 for mounting camming arms 38 (FIG. 8), so that distal camming members 38' of the camming members 38 may pass through the slots 34 and enter in engagement with the annular groove 14 of the male coupler component 20' of the first male component 20 as described hereinabove. The camming arms and camming members are conventional and operate in similar manner as in the prior-art devices. Extending from the female receptacle portion 32 is a tongue-receiving, protection-portion or socket portion 40 defining a bifurcated section 42 having a first arm 40' and a second, somewhat thicker arm 40''. The second arm 40'' is thicker than the first arm 40' since it is more distant from the mounting flange 22 of the first male component when the first male component and second female component are secured together, whereby the second, remote arm 40'' is more exposed and susceptible to tampering and cutting. The second arm 40'' also projects lower than the first arm 40', again in order to provide a tamper-proof device. Each arm 40', 40'' has a through slot 42' which passes therethrough the locking tongue 24' of the first male component 20. As the locking tongue is passed therethrough, the through-hole 26 thereof is located approximately midway between the arms 40', 40'' of the bifurcated section 40, so that the shaft of a padlock, or other locking or securing device, may pass. The shaft or bolt of the padlock itself is protected by the arms 40', 40'' of the projecting bifurcated section 42, so that access thereto by a saw, bolt cutter, or the like, is prevented, in a manner shown in FIG. 10. The assembled first and second parts of the security closure cap device of the invention is shown in FIGS. 9-11. In this embodiment, there is unrestricted flow of the fluid from the storage tank through the coupler outlet proper 20'. It is noted that the projecting security tongue 24' provides a fluid-tight seal within the through openings or slots 42' of the bifurcated arm 40', 40'', which is of special importance when the stored liquid in the storage tank is volatile, such as is the case with alcohol or gasoline, where fumes leak out.

Referring to FIGS. 6B and 6C, there is shown a modification of the female component. In this modification, each of the arms 40' and arms 40'' of the bifurcated section 42 is provided with at least one drilled hole or passageway in which are mounted reinforcing steel, cut-resistant pins 41', 41'', respectively. Each pin or rod 41', 41'' is oriented along the height of each respective arm, or as shown in FIG. 6C, vertically therealong. The pins are held in place by horizontal or transverse cross-pins 43' passing through holes formed in the bottom of each arm 40', 40'', as best seen in FIG. 6C. These hardened steel rods serve to provide additional or supplemental prevention or resistance to cutting through the arm by a saw or abrasive cutter. Preferable, two such pins or rods are provided in each arm 40', 40'', as seen in FIG. 6B, which rods are laterally and strategically separated to offer the greatest resistance to cutting. Each rod is preferably made of hardened steel. It is also noted that each arm may also be provided with additional steel pins or rods of larger diameter, as may be required. Moreover, instead of fixing the rods in place via the spring cross-pins 43', 43'', each may adhesively secured in place using well-known, conventional techniques. Alternatively, or in addition to, instead of each pin 41', 41'' being fixed in place, each pin may be allowed free or partial rotation within its hole or passageway, so that, when a rotary saw or abrasive cutter reaches thereat, each pin will rotate along with the cutter, to thereby prevent further cutting through of the arms 40', 40''. Such rotation is accommodated by suitably cut horizontal grooves formed in the bottom of the rods 41', 41'', that allow relative rotation between the pins 41', 41'' and the retaining pin 43', 43''. Alternatively, the retaining pins 43', 43'' may be dispensed with, allowing the pins to freely rotate within their holes.

Referring now to FIGS. 12-20, there is shown a second embodiment of the invention, which also is made up of a first male outlet component and a second female closure cap component. The first male outlet component 50, best seen in FIGS. 12-14, is made up of an enlarged mounting flange element 52 integrally connected at one end of a hollow or tubular male coupler proper 50' closest to the storage tank when mounted for use with a storage tank, which male coupler proper also has an internal-thread section 50'', either of male or female threads, at its end adjacent the flange for receiving a hose connection associated with the storage tank. The mounting flange element 52 is affixed to a wall of the storage tank or to a bulkhead associated with the storage tank for protecting it, by tamper-proof fasteners passing through an array of through-holes 52'. The flange element 52 is completely circular in cross section unlike the flange element 22 of the first embodiment. The male coupler proper 50' has an outer, circumferential, annular groove 54 similar to the groove 14 of the first embodiment. The male coupler proper 50' has a first end face integrally connected to the flange element 52, and a second end face 54' facing oppositely to that end face to which the flange element 52 is connected and from which it extends. The second end face 54' is provided with a cross or diametric rib element 56'' from which projects axially and centrally therefrom a protruding locking or securing tongue or element 58, which tongue 58 serves the same function as the tongue 24' of the first embodiment. The tongue 58 has a through hole 58' through which passes the bolt or shaft of a locking padlock or other securing or locking device.

Figure 19:
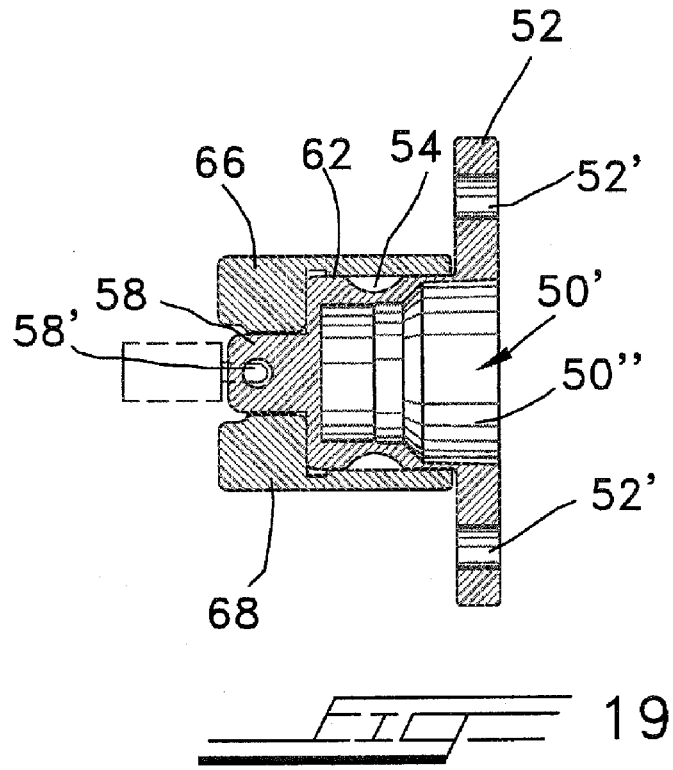
FIG. 19 is an elevational cross-sectional view showing the first male part of FIG. 12 mounted to the second female part of FIG. 15 according to the second embodiment.

The second mating part of the second embodiment is best seen in FIGS. 15-18, and is made up of a female closure cap element 60 having a main, female receptacle portion 62 which telescopingly receives therein the male coupler proper 54, as best seen in FIG. 19. The receptacle portion 62 has an end-surface face 62' in which is formed a centrally-located, elongated through-slot or opening 64 through which passes the tongue 58 of the male coupler component when the first and second parts are connected together to close off access to the contents of a storage tank. Protruding or extending from the surface face 62' is a pair of oppositely-disposed walls or partitions 66, 68 which serve the function as the arms 40', 40'' of the first embodiment, which is to prevent access to the bolt or shaft of the padlock passing through the hole 58' of the tongue 58, whereby a saw, bolt cutter, or the like, is prevented from being used to cut the padlock, whereby separation of the male and female parts is substantially prevented. The elongated slot 64 is oriented so that is extends perpendicularly between the pair of partitions 66, 68, so that to orient the tongue such that axis of the through-hole 58' thereof is parallel with the partitions 66, 68, so that bolt or shaft of the locking device may be readily passed through the hole without obstruction.

Figure 20:
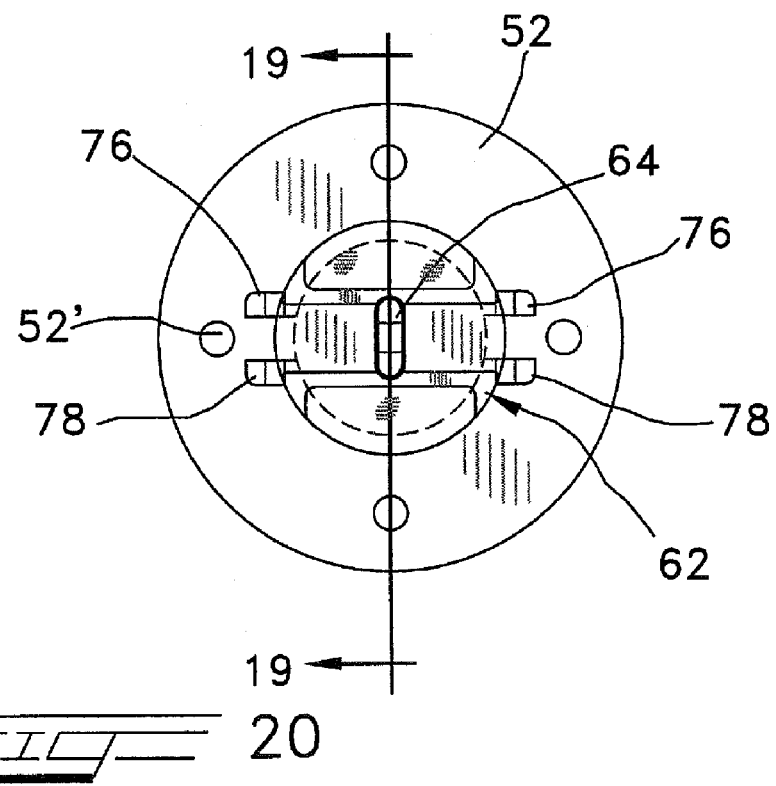
FIG. 20 is a front view thereof.

The female receptacle portion 62 is also provided with a pair of diametrically-opposed slots or openings defined between mounting arms or brackets 76 and 78 for mounting camming arms 72, in the same manner as described above with regard to the first embodiment, where distal camming members 72" of the camming members 72 pass through the slots and enter in engagement with the annular groove 54 of the male coupler component 54 of the first male component 50, as described hereinabove. The camming arms and camming members are conventional and operate in similar manner as in the prior-art devices. The complete assembly of the first and second parts of the security closure cap device of the invention is shown in FIGS. 19 and 20. It is noted that in this second embodiment, where there is provided a central slot, a gasket or seal lines the slot 64 in order to provide a fluid-tight seal.

Figure 15C:
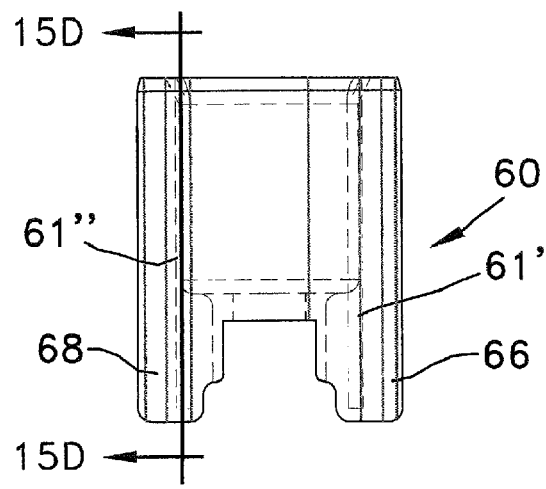
FIGS. 15B-15D show a modification of the coupler of FIG. 12 showing reinoforcing rods or pins inserted therein for additional prevention against tampering by a rotary saw or abrasive cutter.
Figure 15B:
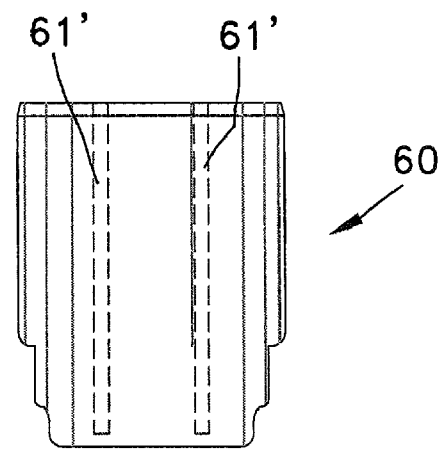
Figure 15D:
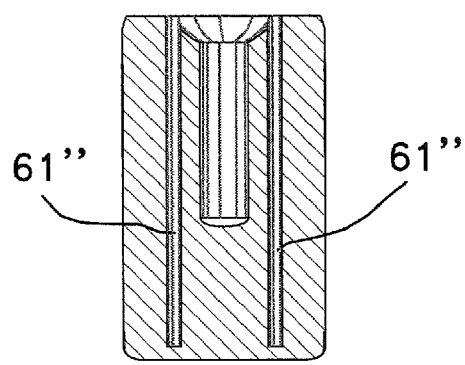

Referring to FIGS. 15B-15D, there is shown a modification of the female component of the second embodiment. In this modification, each of the walls 66, 68 is provided with at least one drilled hole or passageway in which are mounted steel, cut-resistant pins 61', 61", respectively. Each pin or rod 61', 61" is oriented vertically as shown in FIG. 15B in its respective arm. In this form of the modification, no horizontal or transverse cross-pins are provided, as in the modification of the first embodiment. Instead, each pin 61', 61" is allowed free rotation within its hole or opening, so that, when a rotary saw or abrasive cutter reaches thereat, each pin will rotate along with the cutter, to thereby prevent further cutting through of the walls 66, 68. Alternatively the hardened steel rods may be fixed in place using retaining pins, in the manner described hereinabove regarding the modification of the first embodiment. Preferably, two such pins or rods are provided in each wall 66,68, as seen in FIG. 15D, which rods are laterally and strategically separated to offer the greatest resistance to cutting. Each rod is preferably made of steel. It is also noted that each arm may also be provided with additional steel pins or rods of larger diameter, as may be required.

Referring now FIGS. 21-28, a third embodiment of the security closure cap device of the invention is shown. In this embodiment, the coupler-outlet connected to the wall of the storage tank or to a bulk head is a female component, rather than a male component as in the first and second embodiments, while the closure cap is the male component. Referring to FIGS. 24-28 for now, the first female coupler-component 80 that is directly coupled to the hose-coupler of the storage tank or to a bulk head is shown, and consists of a circular-shaped mounting flange 82 with a plurality of holes 84 for mounting the flange, and, therefore, the female component 80 to the storage tank or bulkhead, which female coupler proper also has internal-thread section 82", either of male or female threads, at its end adjacent the flange for receiving a hose connection associated with the storage tank. Projecting outwardly and centrally from the mounting flange 82 is a female coupler proper 88, which is also circular in cross section. The female coupler proper 88 has ears or brackets 90, 92 similar to the ears 36 of the female component 30 of the first embodiment, with slots 94' also being provided similar to the diametrically-opposed slots or openings 34 defined between mounting ears or brackets 90 and 92 for mounting camming arms (not shown for clarity), so that distal camming members of the camming members may pass through the slots and enter in engagement with an annular groove of the second male coupler component of the third embodiment described hereinbelow. Projecting and extending internally in the female coupler proper 88 is an axially-extending locking tongue or shaft 90 having an overall length greater than the axial length of the female coupler proper 88 so that distal the end-portion 88' thereof projects outwardly of a plane containing therein the annular end-surface 90' of the female component proper.

Figure 21:
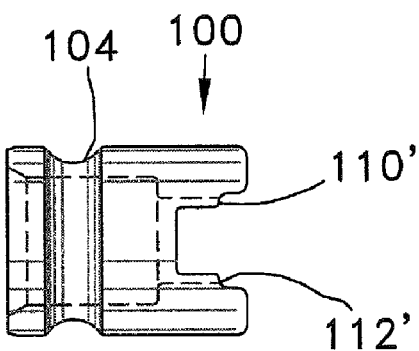
FIG. 21 is a side view of the first male closure cap component according to a third embodiment of the invention.
Figure 22:
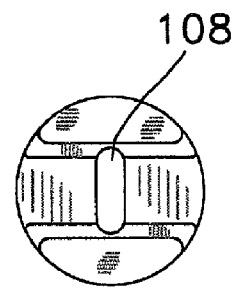
FIG. 22 is a top view thereof.
Figure 23A:
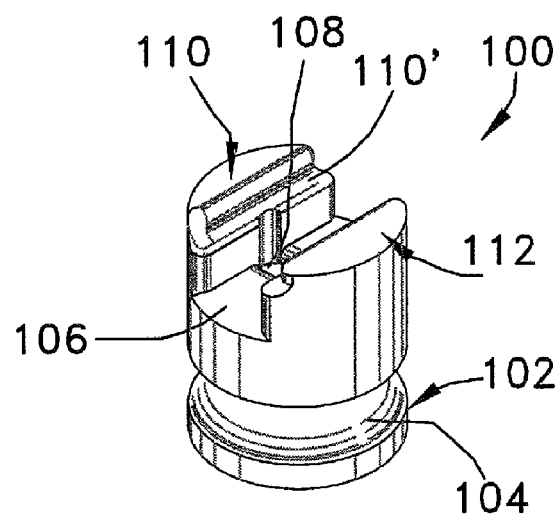
FIG. 23A is an isometric view thereof.

Referring now to FIGS. 21-23, there is shown the second male component 100 of the third embodiment, which constitutes the security closure cap element. The second male component 100 is made up of a male main portion or coupler proper 102 defining a circumferential annular groove or slot 104 for receiving therein the camming members of the camming arms associated with the first female component 80 described hereinabove, in the conventional manner. The male component proper 102 defines an end-face or end-surface 106 that faces away from the first female component 80 when the first and second components are secured together. Formed in this end-surface 106 is an elongated through-slot or opening 108 for passing therethrough the protruding distal end-portion 88' of the locking tongue 90 of the first female component proper 88. Upstanding walls or partitions 110, 112, similar to the partitions 66, 68 of the second embodiment, are provided in order to prevent access to the shaft or bolt of a padlock or other securing or locking device passing through the through-hole 90" formed in the distal end-portion of the locking tongue 90. The slot 108 extends perpendicular between the two partitions or walls 110, 112 in order to allow ease of access for placing bolt of the padlock through the hole 90". It is also noted that each of the walls or partitions 110,112 defines a stepped interior-facing surface 110', 112' so that the lateral distance between the walls increases in a direction away from the end-surface 106, so that the padlock or securing device whose bolt or shaft passes through the through-hole 90" is amply accommodated. The stepped interior-facing surface configuration also applies also to the walls 66, 68 of the female closure cap element 60 of the second embodiment, as seen in FIG. 15.

Figure 23B:
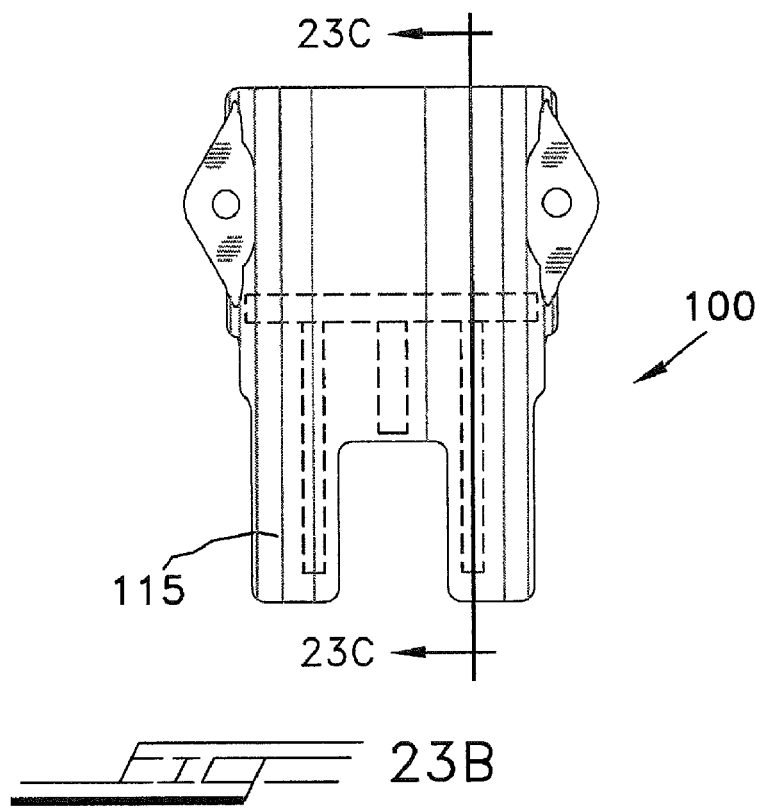
FIGS. 23B-23C show a modification of the coupler of FIG. 21 showing reinforcing rods or pins inserted therein for additional prevention against tampering by a rotary saw or abrasive cutter.
Figure 23C:
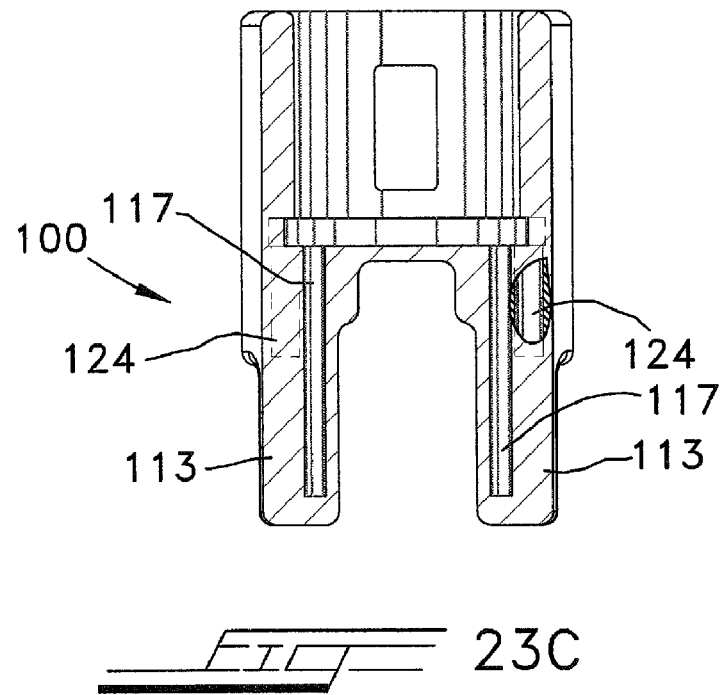
Figure 24:
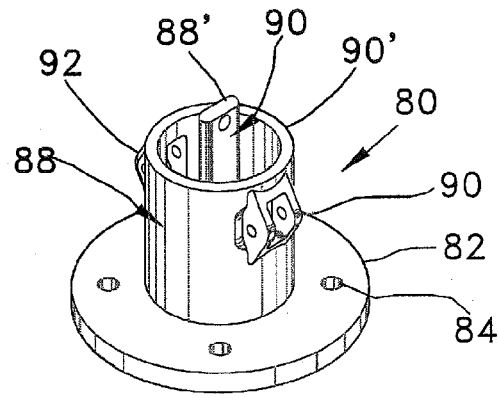
FIG. 24 is an isometric view of the second female coupler-outlet component according to a third embodiment.
Figures 25, 26:
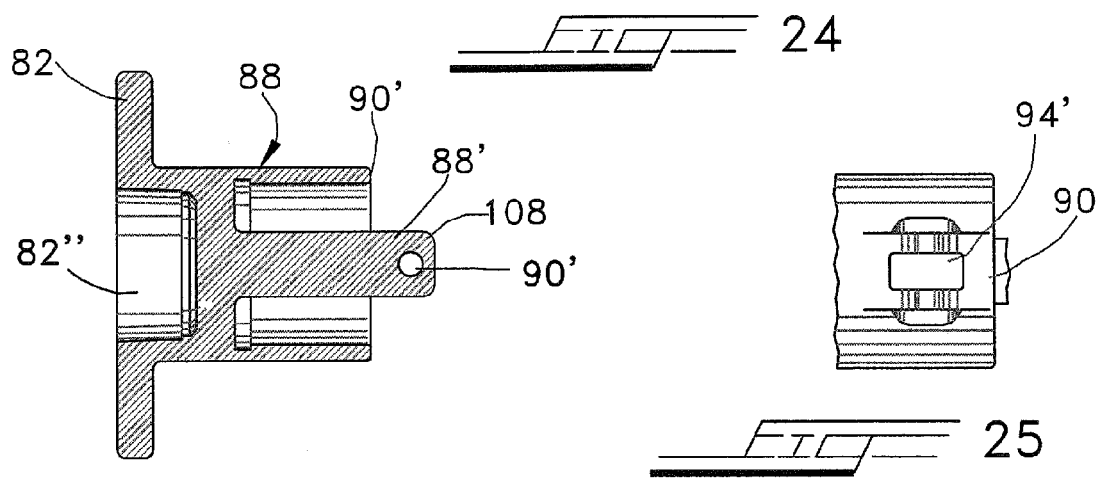
FIG. 25 is a partial side view thereof showing the slot-receptacle for reception of a camming arm.
FIG. 26 is a cross-sectional view taken along line 26-26 of FIG. 27.
Figure 27:
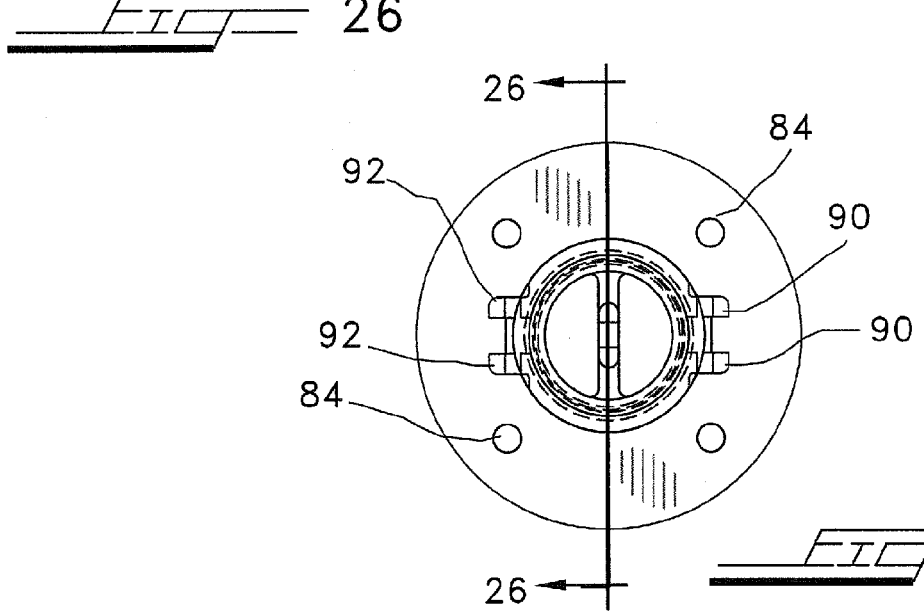
FIG. 27 is a bottom view thereof.
Figure 28:
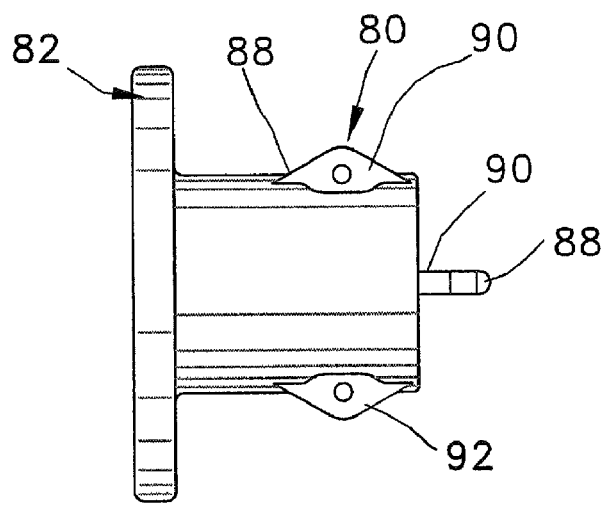
FIG. 28 is a side view thereof.
Figure 30:
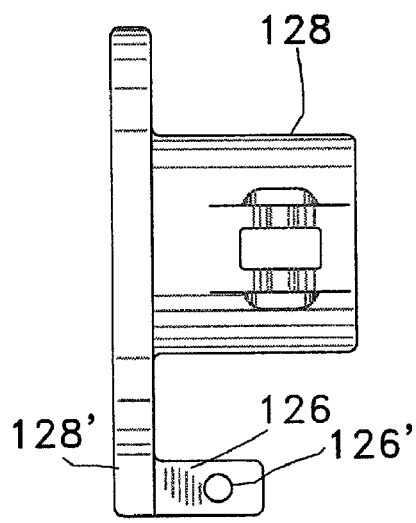
FIG. 30 is a side elevational view thereof.
Figure 29:
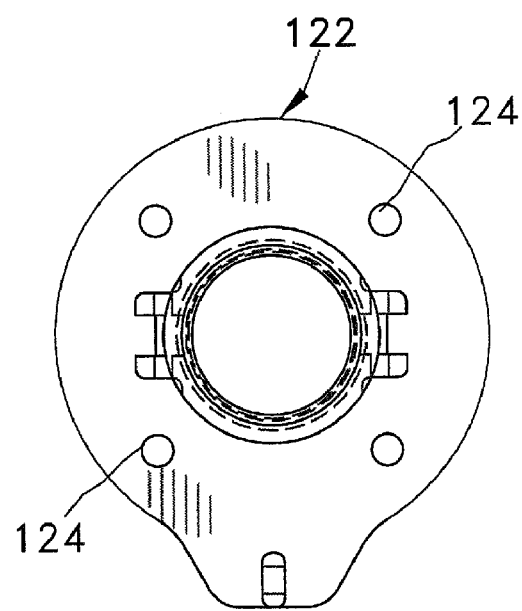
FIG. 29 is a bottom view of the female coupler-outlet component according to a fourth embodiment.
Figure 37:
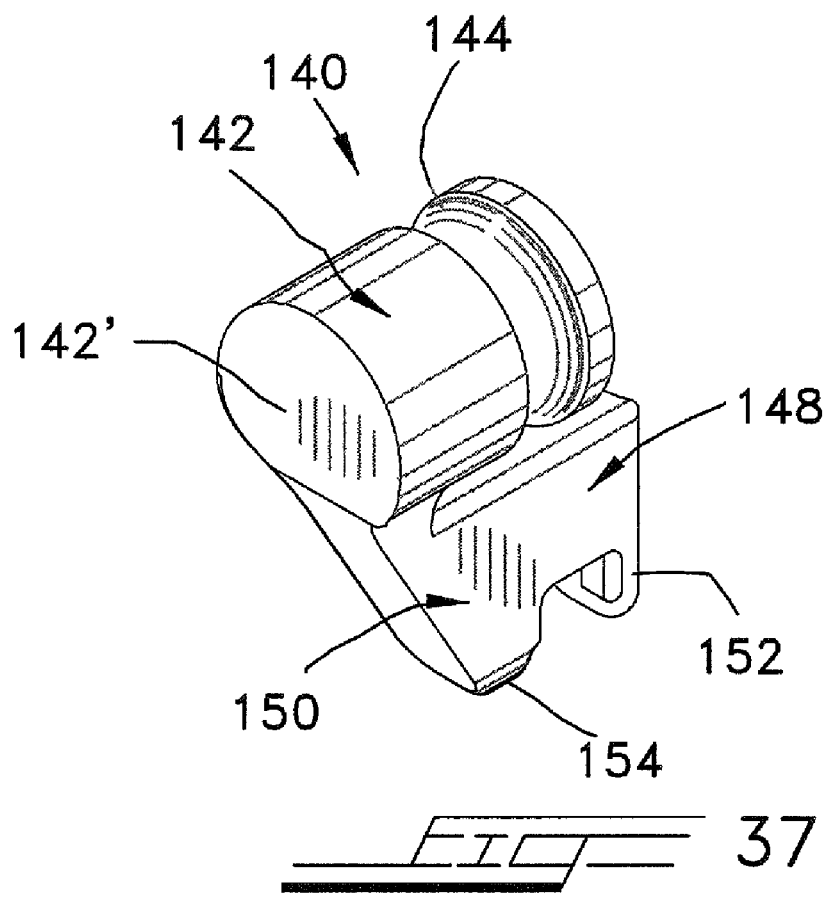
FIG. 37 is an isometric view thereof.

Referring to FIGS. 23B-23C, there is shown a modification of the male component of the third embodiment. In this modification, the walls are doubly bifurcated so as to provide a first pair of lateral walls 113 and a second pair of lateral walls 115, in each of which is provided a steel rod or pin 117 in the manner described hereinabove regarding the first and second embodiments. The pins 117 may be fixed in place and or be rotatable in the holes or passageways, as described above. In addition, a second series of pins or rods 121 may also be provided, which are of greater diameter than the pins 117. These pins 121, like the pins 117, may be fixed in place or rotatable, as described hereinabove. In a preferred embodiment, the pins or rods 117 are 3/16 inch in diameter while the pins 121 are 1/4 inch in diameter.

Referring now FIGS. 29-38, there is shown a fourth embodiment of the security closure cap device of the invention. In this embodiment, the coupler-outlet connected to hose-connector of the storage tank or to a bulk head is a female component like the third embodiment, rather than a male component of the first and second embodiments, while the closure cap is the male component. Referring to FIGS. 29-32, the first female coupler-component 120 that is directly coupled to the wall of the storage tank or to a bulk head is shown, and consists of a circular-shaped mounting flange 122 with a plurality of holes 124 for mounting the flange, and therefore, the female component 120 to the storage tank or bulkhead. Projecting outwardly and centrally from the mounting flange 122 is a female coupler proper 128, which has main circular portion and a lower lobe or eccentric section 128' from which projects a locking tongue or element 126 with through hole 126', which female coupler proper also has internal-thread section 122", either of male or female threads, at its end adjacent the flange for receiving a hose-connection associated with the storage tank. The flange with tongue is similar to those of the first embodiment of FIGS. 1-4. The female coupler proper 128 has ears or brackets 130,132 similar to the ears 36 of the female component 30 of the first embodiment, with slots also being similar to the diametrically-opposed slots or openings 34 defined between mounting ears or brackets 36 of the first embodiment for mounting camming arms (not shown for clarity), so that distal camming members of the camming members may pass through the slots and enter in engagement with an annular groove of the second male coupler component of the fourth embodiment described hereinbelow.

Referring now to FIGS. 33-36, there is shown the second male component 140 of the fourth embodiment, which constitutes the security-closure cap element. The second male component 140 is made up of a male main portion or coupler proper 142 defining a circumferential annular groove or slot 144 for receiving therein the camming members of the camming arms associated with the first female component 120 described hereinabove, in the conventional manner. The male component proper 142 defines an end-face or end-surface 142' defining the closure cap proper. Projecting downwardly from the male coupler proper 142 is a tongue-receiving, protection-portion 148 defining a bifurcated section 150 defining a first arm 152 and a second, somewhat thicker arm 154. The second arm 154 is thicker than the first arm 152, since it is the arm more distant from the mounting flange 22 of the first female component when the first female component and second male component are secured together, whereby the second, remote arm 154 is more exposed and susceptible to tampering and cutting. Each arm 152,154 has a through slot which pass therethrough the locking tongue 136 of the first female component 120, in a manner similar to the first embodiment of FIGS. 1-10. As the locking tongue is passed therethrough, the through-hole 126' thereof is located approximately midway between the arms 152,154 of the bifurcated section 150, so that the shaft of a padlock, or other locking or securing device, may pass. The shaft or bolt of the padlock itself is protected by the arms 152,154 of the projecting bifurcated section 150, so that access thereto by a saw, bolt cutter, or the like, is prevented. The assembled first and second parts of the security closure cap device of the invention is shown in FIG. 33, which also shows camming arms 160, 162 that function in the conventional manner, and as described hereinabove with reference to the first embodiment. The tongue-receiving, protection-portion 148 projects or protrudes axially outwardly as compared with the male main portion or coupler proper 142 as seen in FIG. 35, whereby the arm 152 lies in plane spaced from the plane containing therein the end surface face 148' that lies closest to the interior face of the mounting flange 122 when the male and female parts are connected together, so that the end surface-face 152' of the tongue-receiving, protection-portion 148 abuts substantially against the interior surface-face of the flange 122 when the male and female parts are connected in order to provide for additional security.

Figure 38A:
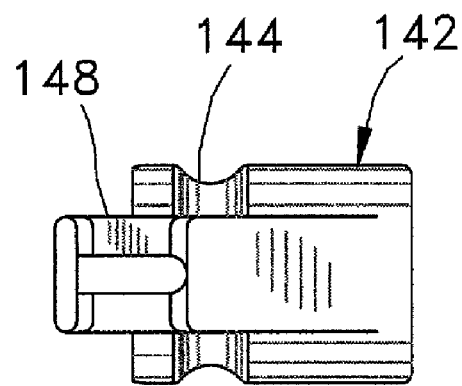
FIG. 38A is a top view thereof.

Referring to FIGS. 38B-38D, there is shown a modification of the male component. In this modification, the arms 152, 154 of the bifurcated section 150 is provided with at least one drilled hole or passageway in which are mounted steel or cut-resistant pins 151. Each pin is retained by retaining pins 153, in the manner described hereinabove with reference to the first three embodiments. The variations thereof described hereinabove with regard to the first three embodiments, also apply here as well.

In any of the above embodiments, an internal check valve may be used in order to allow the connector to provide a pressure seal. Due to safety considerations, a "dust cap" or "plug" closure is not permitted for containing system pressure. In addition, the coupling and closure device of the invention may be made from any of the materials typically utilized for standard cam-and-groove couplings; however, ductile iron, brass or stainless steel are the preferred materials. Conventional barbed hose connection, weld connection, or tube connection may be used. The hoses used for connection are typically of a diameter between one inch and twelve inches, although it is possible to use the system with hoses of greater diameter. The security system of the invention may be used on all types of storage tanks that store liquid fats, grease, gas, alcohol, as well as many other liquids.

It is also noted that while the above-described embodiments have been shown to include conventional camming arms with distal camming members for reception in an annular groove of the male coupler component, in order that a part of the security system of the invention includes the conventional cam and groove hose coupling of the prior art, the camming arms with camming members of the security system of the invention may be dispensed with entirely.

While specific embodiments of the invention have been shown and described, it is to be understood that numerous changes and modifications may be made therein without departing from the scope and spirit of the invention as set forth in the appended claims.

What is claimed is:

1. A security closure-cap device for closing off the outlet connection of a storage tank storing fluid therein, the storage tank being provided with an outlet, comprising:
    a first outlet component connectable to an outlet connection of a storage tank;
    a second closure-cap component connectable to said first outlet component;
    said first outlet component comprising a main body portion having first end defining a connecting section for connection to the outlet connection of a storage tank, and a second end distal from the first end, a mounting flange at said first end for mounting said first outlet component to a wall, and a projecting securing element defining a first end and a second end, and having a through-opening formed therein;
    said second closure-cap component comprising a substantially hollow-interior main body section for cooperating with said main body portion of said first outlet component; said main body section comprising a first open end leading to said hollow interior and a second substantially closed end for forming a closure cap proper, and a securing-element receiving portion through which passes a portion of said projecting securing element;
    said second closure-cap component further comprising a bifurcated partition element defining a pair of walls between which walls extends said portion of said projecting securing element, with said through-opening thereof being located between said pair of walls, whereby a locking device having a shaft may pass through said through-opening, with said pair of walls preventing access to the shaft of the locking device by a cutting instrument;
    each said wall having at least one elongated passageway formed therein;

at least one reinforcing pin positioned in a said at least one passageway of each of said pair of walls of said bifurcated partition element, whereby, when said first and second components are connected together to close off the outlet of a storage tank, the locking device securing together said first and second components is substantially tamper-proof.

2. The security closure-cap device for closing off the outlet connection of a storage tank storing fluid therein according to claim 1, wherein said first component is a male component, and said second component is a female component; said securing element being a tongue projecting from a peripheral portion of said mounting flange; said bifurcated partition element of said second component extending from said main body section in a direction toward said peripheral portion of said mounting flange when said first and second components are connected together; said securing-element receiving portion through which passes a portion of said projecting securing element comprising aligned through-slots formed in said bifurcated walls of said bifurcated partition element.

3. The security closure-cap device for closing off the outlet connection of a storage tank storing fluid therein according to claim 2, wherein said bifurcated walls comprise a first wall closest to said flange element when said first and second components are connected together, and a second wall distant therefrom and being of greater thickness than said first wall; said second wall projecting from said bifurcated partition element a greater distance than said first arm in order to provide a greater degree of tamper-proof security.

4. The security closure-cap device for closing off the outlet connection of a storage tank storing fluid therein according to claim 1, wherein said first component is a male component, and said second component is a female component; said securing element being a tongue projecting axially centrally from said second end of said main body portion; said bifurcated partition element of said second component extending substantially axially from said second substantially closed end of said main body section;

said securing-element receiving portion through which passes a portion of said projecting securing element comprising a through-slot formed in said second substantially closed end of said main body section.

5. The security closure-cap device for closing off the outlet connection of a storage tank storing fluid therein according to claim 4, wherein each said wall of said bifurcated partition section comprises a stepped section so that the distance between said walls at a distance removed from said second substantially closed end of said main body section is greater than the distance therebetween at a distance closer to said second substantially closed end of said main body section, in order to better accommodate a locking element.

6. The security closure-cap device for closing off the outlet connection of a storage tank storing fluid therein according to claim 1, wherein said first component is a male component, and said second component is a female component; said male component comprising an annular groove, and said female component comprising camming arms having distal camming members for reception in said annular groove for securing said first and second components together.

7. The security closure-cap device for closing off the outlet connection of a storage tank storing fluid therein according to claim 1, wherein said first component is a female component, and said second component is a male component; said securing element being a tongue projecting from a peripheral portion of said mounting flange; said bifurcated partition element of said second component extending from said main body section in a direction toward said peripheral portion of said mounting flange when said first and second components are connected together; said securing-element receiving portion through which passes a portion of said projecting securing element comprising aligned through-slots formed in said bifurcated walls of said bifurcated partition element.

8. The security closure-cap device for closing off the outlet connection of a storage tank storing fluid therein according to claim 7, wherein said bifurcated walls comprise a first wall closest to said flange element when said first and second components are connected together, and a second wall distant therefrom and being of greater thickness than said first arm; said second wall projecting from said bifurcated partition element a greater distance than said first wall in order to provide a greater degree of tamper-proof security.

9. The security closure-cap device for closing off the outlet connection of a storage tank storing fluid therein according to claim 1, wherein said first component is a female component, and said second component is a male component; said securing element being a tongue projecting axially centrally from said first end of said main body portion and through the hollow interior of said main body portion; said bifurcated partition element of said second component extending substantially axially from said second substantially closed end of said main body section; said securing-element receiving portion through which passes a portion of said projecting securing element comprising a through-slot formed in said second substantially closed end of said main body section.

10. The security closure-cap device for closing off the outlet connection of a storage tank storing fluid therein according to claim 9, wherein each said wall of said bifurcated partition section comprises a stepped section so that the distance between said walls at a distance removed from said second substantially closed end of said main body section is greater than the distance therebetween at a distance closer to said second substantially closed end of said main body section, in order to better accommodate a locking element.

11. The security closure-cap device for closing off the outlet connection of a storage tank storing fluid therein according to claim 1, wherein said first component is a female component, and said second component is a male component; said male component comprising an annular groove, and said female component comprising camming arms having distal camming members for reception in said annular groove for securing said first and second components together.

12. The security closure-cap device for closing off the outlet connection of a storage tank storing fluid therein according to claim 1, wherein each said at least one reinforcing pin comprises an at least partially rotatable pin mounted in a said respective at least one elongated passageway.

13. The security closure-cap device for closing off the outlet connection of a storage tank storing fluid therein according to claim 12, wherein each said wall comprises two spaced-apart said elongated passageways, and two at least partially rotatable pins mounted in said two elongated passageways.

14. The security closure-cap device for closing off the outlet connection of a storage tank storing fluid therein according to claim 1, wherein each said wall comprises two spaced-apart said elongated passageways, and two said reinforcing pins mounted in said two elongated passageways.

15. The security closure-cap device for closing off the outlet connection of a storage tank storing fluid therein according to claim 1, further comprising at least one retaining member for each said wall for mounting each respective said reinforcing pin in a respective said elongated passageway.

16. In a security closure-cap device for closing off the outlet connection of a storage tank storing fluid therein, the storage tank being provided with an outlet, comprising:

a closure-cap component comprising a substantially hollow-interior main body section;

said main body section comprising a first open end leading to said hollow interior and a second substantially closed end for forming a closure cap proper, and a securing-element receiving portion through which passes a portion of a projecting securing element;

said second closure-cap component further comprising a bifurcated partition element defining a pair of walls;

each said wall having at least one passageway formed therein;

at least one reinforcing pin positioned in a said at least one passageway of each of said pair of walls of said bifurcated partition element, whereby, when said first and second components are connected together to close off the outlet of a storage tank, the locking device securing together said first and second components is substantially tamper-proof;

each said wall of said bifurcated partition section comprising a stepped section so that the distance between said walls at a distance removed from said second substantially closed end of said main body section is greater than the distance therebetween at a distance closer to said second substantially closed end of said main body section, in order to better accommodate a locking element.

17. The security closure-cap device for closing off the outlet connection of a storage tank storing fluid therein according to claim 16, wherein each said at least one reinforcing pin comprises an at least partially rotatable pin mounted in a respective said at least one elongated passageway.

18. The security closure-cap device for closing off the outlet connection of a storage tank storing fluid therein according to claim 16, wherein each said wall comprises two spaced-apart said elongated passageways, and two said reinforcing pins mounted in said two elongated passageways.

19. The security closure-cap device for closing off the outlet connection of a storage tank storing fluid therein according to claim 16, further comprising at least one retaining member for each said wall for mounting each respective said reinforcing pin in a respective said elongated passageway.

* * * * *